(12) United States Patent
Palavalli et al.

(10) Patent No.: US 10,942,788 B2
(45) Date of Patent: Mar. 9, 2021

(54) POLICY CONSTRAINT FRAMEWORK FOR AN SDDC

(71) Applicant: VMWARE, INC., Palo Alto, CA (US)

(72) Inventors: Amarnath Palavalli, Palo Alto, CA (US); Sachin Mohan Vaidya, Pune (IN); Pavlush Margarian, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/200,678

(22) Filed: Nov. 27, 2018

(65) Prior Publication Data

US 2019/0384645 A1    Dec. 19, 2019

(30) Foreign Application Priority Data

Jun. 15, 2018    (IN) .............................. 201841022440

(51) Int. Cl.
  *G06F 15/173*    (2006.01)
  *G06F 9/50*    (2006.01)
  (Continued)

(52) U.S. Cl.
  CPC .......... *G06F 9/5077* (2013.01); *G06F 9/5011* (2013.01); *H04L 63/0263* (2013.01);
  (Continued)

(58) Field of Classification Search
  USPC ................................. 709/226, 223, 224, 225
  See application file for complete search history.

(56) References Cited

U.S. PATENT DOCUMENTS 8,627,442 B2    1/2014 Ji et al.
9,152,803 B2 *  10/2015 Biswas ................. G06F 21/604
(Continued)

FOREIGN PATENT DOCUMENTS

CN    108809722 A    11/2018
WO   2011159842 A2   12/2011
(Continued)

OTHER PUBLICATIONS

Author Unknown, "E-Security Begins with Sound Security Policies," Jun. 14, 2001, 23 pages, Symantec Corporation.
(Continued)

*Primary Examiner* — Lan Dai T Truong
(74) *Attorney, Agent, or Firm* — Adeli LLP

(57) ABSTRACT

Some embodiments of the invention provide a method for processing requests for performing operations on resources in a software defined datacenter (SDDC). The resources are software-defined (SD) resources in some embodiments. The method initially receives a request to perform an operation with respect to a first resource in the SDDC. The method identifies a policy that matches (i.e., is applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC. The method rejects the received request when the identified policy specifies that the requested operation violates a constraint on operations specified for the first resource.

23 Claims, 7 Drawing Sheets

(51) Int. Cl.
  *H04L 29/08* (2006.01)
  *H04L 29/06* (2006.01)
(52) U.S. Cl.
  CPC ........ *H04L 63/101* (2013.01); *H04L 67/1076* (2013.01); *H04L 67/1089* (2013.01); *H04L 67/32* (2013.01); *G06F 2209/506* (2013.01)

(56) References Cited

U.S. PATENT DOCUMENTS

| | | | |
|---|---|---|---|
| 9,594,546 | B1 | 3/2017 | Todd et al. |
| 9,674,275 | B1 | 6/2017 | Engers et al. |
| 10,205,701 | B1 | 2/2019 | Voss et al. |
| 10,270,796 | B1 | 4/2019 | Veeraswamy et al. |
| 2004/0098154 | A1 | 5/2004 | McCarthy |
| 2012/0150912 | A1* | 6/2012 | Ripberger ............... G06F 21/80 707/786 |
| 2012/0304275 | A1 | 11/2012 | Ji et al. |
| 2013/0018994 | A1 | 1/2013 | Flavel et al. |
| 2013/0019314 | A1 | 1/2013 | Ji et al. |
| 2015/0063166 | A1 | 3/2015 | Sif et al. |
| 2015/0379281 | A1 | 12/2015 | Feroz et al. |
| 2016/0036860 | A1* | 2/2016 | Xing ................... G06F 21/6227 726/1 |
| 2016/0080422 | A1 | 3/2016 | Belgodere et al. |
| 2017/0005986 | A1 | 1/2017 | Bansal et al. |
| 2017/0031956 | A1 | 2/2017 | Burk et al. |
| 2017/0063782 | A1 | 3/2017 | Jain et al. |
| 2017/0206034 | A1 | 7/2017 | Fetik |
| 2017/0366416 | A1 | 12/2017 | Beecham et al. |
| 2017/0374106 | A1 | 12/2017 | Hamou et al. |
| 2018/0083835 | A1 | 3/2018 | Cole et al. |
| 2018/0089299 | A1* | 3/2018 | Collins ................. G06F 9/5061 |
| 2018/0131675 | A1 | 5/2018 | Sengupta et al. |
| 2018/0183757 | A1 | 6/2018 | Gunda et al. |
| 2018/0295036 | A1 | 10/2018 | Krishnamurthy et al. |
| 2019/0229987 | A1 | 7/2019 | Shelke et al. |
| 2019/0386877 | A1 | 12/2019 | Vaidya et al. |
| 2020/0065080 | A1 | 2/2020 | Myneni et al. |
| 2020/0065166 | A1 | 2/2020 | Myneni et al. |

FOREIGN PATENT DOCUMENTS

| | | |
|---|---|---|
| WO | 2016160523 A1 | 10/2016 |
| WO | 2018044352 A1 | 3/2018 |
| WO | 2019241086 A1 | 12/2019 |
| WO | 2020041073 A1 | 2/2020 |

OTHER PUBLICATIONS

International Search Report and Written Opinion of Commonly Owned International Patent Application PCT/US2019/036201, dated Jul. 26, 2019, 14 pages, International Searching Authority (EPO).

Non-Published commonly owned U.S. Appl. No. 16/200,677, filed Nov. 27, 2018, 34 pages, VMware, Inc.

Non-Published commonly owned International Patent Application PCT/US2019/036201, filed Jun. 9, 2019, 28 pages, VMware, Inc.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Rouse, Margaret, "What is SDDC (software-defined data center)?—Definition from WhatIs.com," Mar. 2017, 5 pages, TechTarget.com.

* cited by examiner

```
"target":{
    "target_resource_type":"CommunicationEntry",
    "attribute":"services",                    ——214
    "path_prefix":"/tenantT/domains/{{DOMAIN}}/edge-communication-maps/default/communication-entries/"
},
"constraint_expression":{
    "resource_type":"RelatedAttributeConditionalExpression",
    "related_attribute":{
        "attribute":"destinationGroups"
    },
    "condition":{
        "operator":"INCLUDES",
        "rhs_value":["/tenantT/domains/mgw/groups/VCENTER"],
        "value_constraint":{
            "operator":"INCLUDES",
            "values":["/tenantT/services/HTTP","/tenantT/services/HTTPS"]
        }
    }
}
```

*Figure 2*

```
curl --request PATCH \
--url 'https://{{PolicyManager}}/policy/api/v1/tenantT/constraints/{{DEST_RESTRICT_SERVICES}}' \
--header 'Authorization: Basic YWRtaW46QERtaW4=' \
--header 'Content-Type: application/json' \
--data '{
    "target":{
        "target_resource_type":"CommunicationEntry",
        "attribute":"services",
        "path_prefix":"/tenantT/domains/{{DOMAIN}}/edge-communication-maps/default/communication-entries/"
    },
    "constraint_expression":{
        "resource_type":"RelatedAttributeConditionalExpression",
        "related_attribute":{
            "attribute":"destinationGroups"
        },
        "condition":{
            "operator":"INCLUDES",
            "rhs_value":["/tenantT/domains/gw/groups/VCENTER"},
            "value_constraint":{
                "operator":"INCLUDES",
                "values":["/tenantT/services/HTTP","/tenantT/services/HTTPS"]
            }
        }
    }
}
```

*Figure 4*

```
"target": {
    "target_resource_type": "CommunicationEntry",
    "attribute": "action",
    "path_prefix": "/tenant1/domains/{{DOMAIN}}/edge-communication-maps/default/communication-entries/"
},
"constraint_expression": {
    "resource_type": "ValueConstraintExpression",
    "operator": "EQUALS",
    "values": ["ALLOW"]
}
```

*Figure 5*

POLICY CONSTRAINT FRAMEWORK FOR AN SDDC

RELATED APPLICATION

Benefit is claimed under 35 U.S.C. 119(a)-(d) to Foreign Application Serial No. 201841022440 filed in India entitled "POLICY CONSTRAINT FRAMEWORK FOR AN SDDC", on Jun. 15, 2018, by VMware, Inc., which is herein incorporated in its entirety by reference for all purposes.

BACKGROUND

Today, software defined datacenters (SDDC) are an important part of private and public clouds. To manage SDDCs, a wide and varying type of organization requirements have to be enforced on the resources provided to their users. These include customizations/policies that are highly specific to each SDDC. These requirements go beyond Role Based Access Control (RBAC). For example, these requirements could be firewall policies such as (1) default firewall policy is whitelisting (do not allow any communication unless opened with explicit firewall rule), (2) for a given workload/app, do not allow selected type of traffic, (3) only certain source network addresses can send traffic to a given workload, or (4) do not allow universal deny-all or allow-all rule for a specified router or workload. Supporting these policies adds further challenges when the infrastructure services are truly multi-tenant with each tenant bringing its own policies.

BRIEF SUMMARY

Some embodiments of the invention provide a method for processing requests for performing operations on resources in a software defined datacenter (SDDC). The resources are software-defined (SD) resources in some embodiments. The method initially receives a request to perform an operation with respect to a first resource in the SDDC. The method identifies a policy that matches (i.e., is applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC.

The method rejects the received request when the identified policy specifies that the requested operation violates a constraint on operations specified for the first resource. On the other hand, the method in some embodiments performs the operation associated with the received request when the identified policy specifies that the requested operation satisfies a constraint on operations specified for the first resource. In other embodiments, the method performs this operation only when the request does not violate a constraint of any policy that matches the request. In some embodiments, a matching policy can be expressly specified for the first resource or for the resource's type or can be indirectly specified for the first resource when it is defined for a second resource that is a parent resource of the first resource in the hierarchical resource levels of the SDDC.

In some embodiments, the policies in the set of policies are defined in a declarative format. Also, in some embodiments, examples of resources include forwarding elements (e.g., managed software switches and routers, logical switches and routers implemented by the managed software switches and routers, etc.), physical or logical networks, physical or logical network segments, physical or logical network interfaces, compute elements (e.g., virtual machines, containers, etc.), and service middlebox modules (e.g., service VMs or modules that perform middlebox service operations such as firewall operations, load balancing operations, network address translation operations, encryption operations, intrusion detection operations, intrusion prevention operations, etc.).

The method in some embodiments receives several policies before receiving the request and stores each of these policies in a storage that it uses to identify policies that match subsequently received requests. A received policy in some embodiments includes a target that specifies a set of one or more datacenter resources to which the policy applies. It also includes an expression that specifies a constraint on operations on the specified resource set. The received policies are expressed in a declarative format in some embodiments.

The target of each policy in some embodiments includes a resource type for the specified resource set, and a path prefix that identifies the specified resource set in the resource hierarchy of the datacenter. In some embodiments, an expression for a received policy specifies one or more constraint on operations that can be specified on the policy's target resource set. One example of a constraint is a value constraint that restricts a value of an attribute of a resource that is a target of the policy. In some embodiments, the value constraint includes an operator that is one of an include operator, an exclude operator or an equal operator. Another example of a constraint is an entity instance count constraint that restricts number of instances of the target resource. Still another example is a related attribute constraint that restricts a value of a secondary attribute of the target resource that has a primary attribute defined by a value constraint.

When the first resource that is the target operation of the received request is at a particular level in the resource hierarchy, the method in some embodiments identifies a policy associated with the first resource by comparing the request's set of attributes with attribute sets of policies specified for the first resource or parent resources of the first resource on the resource hierarchy. Examples of requested operations on target resources in some embodiments include creation or modification of forwarding rules for forwarding data messages, creation or modification of service rules for performing middlebox service operations on data messages, and deployments or modification of deployments of machine and/or network elements in the datacenter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 2 illustrates an example of a received policy.

FIG. 4 illustrates an example to show how the policy of FIG. 2 is provided to the policy input processor in some embodiments.

FIG. 5 illustrates another example of a policy.

DETAILED DESCRIPTION

Figure 1:
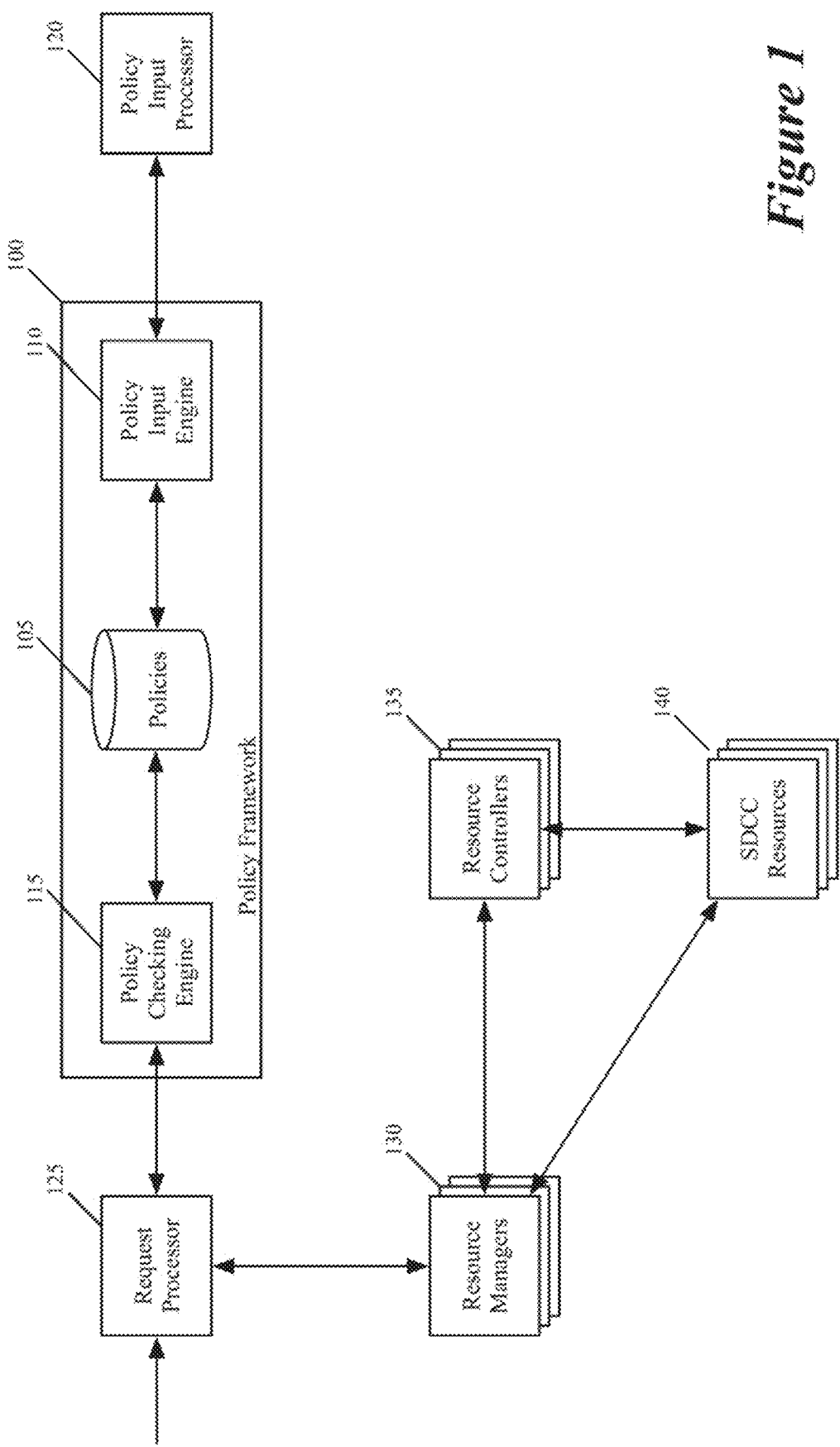
FIG. 1 illustrates an example of a policy framework of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a policy framework for validating requests for performing operations on resources in a software defined datacenter (SDDC). The resources are software-defined (SD) resources in some embodiments. When the policy framework receives a request to perform an operation with respect to a first resource in the SDDC, it identifies one or more policies that match (i.e., are applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC.

The policy framework rejects the received request when policy identified for the received request specifies that the requested operation violates a constraint on operations specified for the first resource. On the other hand, the framework validates this operation when the request does not violate any constraint of any identified policy that matches the request. In some embodiments, a matching policy can be expressly specified for the first resource or for the resource's type or can be indirectly specified for the first resource when it is defined for a second resource that is a parent resource of the first resource in the hierarchical resource levels of the SDDC.

In some embodiments, the policies in the set of policies are defined in a declarative format. Also, in some embodiments, examples of resources include forwarding elements (e.g., managed software switches and routers, logical switches and routers implemented by the managed software switches and routers, etc.), physical or logical networks, physical or logical network segments, physical or logical network interfaces, compute elements (e.g., virtual machines, containers, etc.), and service middlebox modules (e.g., service VMs or modules that perform middlebox service operations such as firewall operations, load balancing operations, network address translation operations, encryption operations, intrusion detection operations, intrusion prevention operations, etc.).

When the first resource that is the target operation of the received request is at a particular level in the resource hierarchy, the policy framework in some embodiments identifies a policy associated with the first resource by comparing the request's set of attributes with attribute sets of policies specified for the first resource or parent resources of the first resource on the resource hierarchy. Examples of requested operations on target resources in some embodiments include creation or modification of forwarding rules for forwarding data messages, creation or modification of service rules for performing middlebox service operations on data messages, and deployments or modification of deployments of machine and/or network elements in the datacenter.

FIG. 1 illustrates an example of a policy framework 100 of some embodiments. As shown, this framework includes a policy storage 105, a policy input engine 110, and a policy checking engine 115. As further described below, this framework interacts with a policy input processor 120 to store policies in the policy storage 105 and interacts with a request processor 125 to validate requests to perform operations on several SDDC resources 140.

For any request that the framework validates, the request processor 125 uses one or more resource managers 130 to perform the operation associated with the request. As further described below, the resource manager 130 performs the operation either by directly interacting with the SDDC resources or indirectly through local and/or remote controllers. In some embodiments, the request processor 125, the policy framework 100, the input processor 120, and resource managers 130 execute on different machines (e.g., VMs, containers, standalone servers, etc.) in one or more datacenters and communicate with each other through a network.

In some embodiments, the policy input processor 120 is an API processor that handles input-policy API commands received through an API gateway of an SDDC management system to which the policy framework belongs, or through a user interface that the SDDC management system presents to administrators of the SDDC, the SDDC tenants, and/or SDDC networks. Through these API commands, the policy input processor 120 receives several policies and stores each of these policies in a storage that it uses to identify policies that match subsequently received requests.

Figure 3:
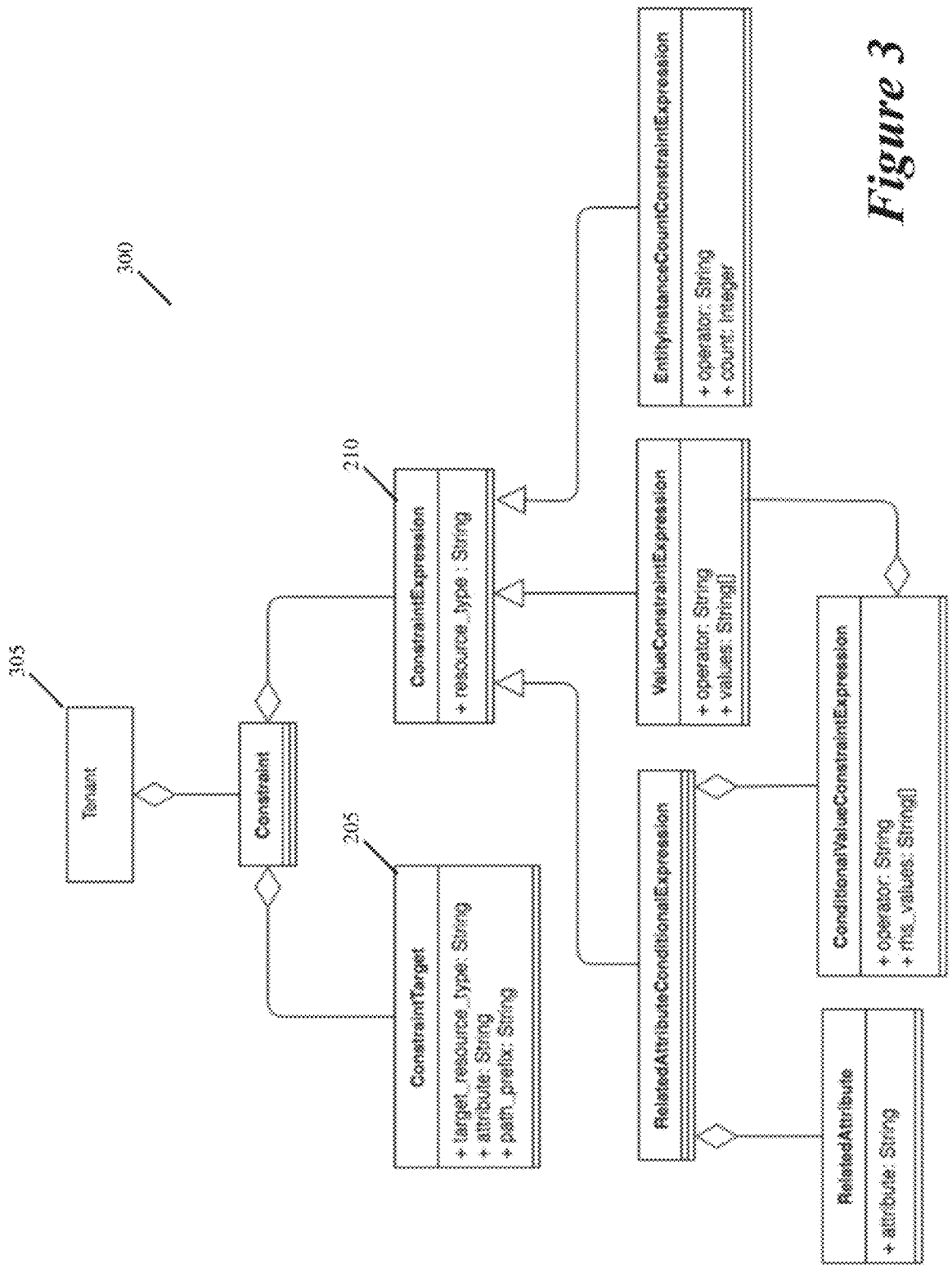
FIG. 3 presents an object diagram of the different components of a policy in some embodiments.

In some embodiments, the received policies are expressed in a declarative format. FIG. 2 illustrates an example of a received policy 200. As further described below, this policy restricts access to destination machines in a destination group to http and https accesses. As shown in FIG. 2, a policy includes (1) a target 205 that specifies a set of one or more datacenter resources to which the policy applies, and (2) an expression 210 that specifies a constraint on operations on the target resource set. This is further illustrated in FIG. 3, which presents an object diagram 300 of the different components of a policy in some embodiments. In the example illustrated in FIG. 3, the policy is specified for a given tenant 305.

The target of each policy in some embodiments includes (1) a type 212 of the target resource set, (2) a name 214 of the target resource set, and (3) a path prefix 216 that identifies the target resource set in the resource hierarchy of the datacenter. As shown, the policy path 216 in some embodiments is in a URL format to uniquely identify a resource or set of resources in a datacenter. In some embodiments, the type and path prefix attributes of the target 205 are used to determine whether a policy is applicable to (i.e., is associated with) an API request (i.e., whether the policy matches a set of attributes associated with the API request).

The path prefix 216 for a policy is specified by reference to one or more resources in the resource hierarchy of the SDDC. In the examples illustrated in FIG. 2 and some of the other figures of this application, the resource hierarchy of the data center includes the following resources: tenant, domain, communication maps, and communication entries. The tenant is a tenant entity (e.g., business entity) that is a tenant of a multi-tenant datacenter. A domain is a workload under a tenant. A communication map is a set of communication rules under a domain that are applicable to communication from/to VMs in the domain, while a communication entry is a single communication rule (e.g., firewall rule) under a communication map.

In some embodiments, a workload is an application or system that is deployed by a user for a specific purpose. One example of a workload includes all the VMs deployed for running outlook application in an enterprise. Another example includes VMs deployed using three tier application templates that specify webservers, application servers, database servers, and zero or more middlebox service machines (e.g., load balancers, firewalls, etc.) between the different tier applications. Other examples of workloads include Sharepoint Workloads, Windows Server VMs, Windows VDI Services VMs, etc.

Examples of communication maps in some embodiments include (1) distributed firewalls (firewall machines implemented on host computers with compute node VMs and/or containers), (2) edge firewall appliances or machines operating at north/south boundary of physical or logical networks, and (3) inserted service modules executing on host computers to provide other middlebox service operations for compute node VMs and/or containers executing on the host computers. In some embodiments, an example of a communication entry includes a tuple that includes the following information: identifier, name, description, source groups, destination groups, services, action, and scope.

In some embodiments, a path prefix can identify a resource or resource set by specifying the path through the resource hierarchy to the identified resource or resource set from the root with all taxonomical parents included in the path. For example, a first policy can be specified for all resources associated with a tenant VMware by specifying the path as /vmware. A second policy can be specified for the Outlook workload of the tenant VMware by using the path /vmware/domains/Outlook. A third policy can be specified for the web-profile of the Outlook workload of the tenant VMware by specifying a path /vmware/domains/Outlook/communication-maps/web-profile. A fourth policy can be specified for the open browser access of Outlook workload of the tenant VMware by using /vmware/domains/Outlook/communicationmaps/web-profile/communication-entries/open-browser-access. More generally, the format for path for a security policy can be specified as: ktenant-name>/domainskworkload-name>/communication-maps/<security-policy-name>/communication-entries/<rule-name>.

In the above-described examples, the first policy is applicable to any resource to which the second, third and fourth policies are applicable, the second policy is applicable to any resource to which the third and fourth policies are applicable, and the third policy is applicable to any resource to which the fourth policy is applicable. This is because the first policy's path prefix is a subset of the path prefix of the second, third and fourth policies, the second policy's path prefix is a subset of the path prefix of the third and fourth policies, and the third policy's path prefix is a subset of the path prefix of the fourth policy. Under this approach, the policies that are applicable to a resource are policies that are specified for the resource or parent resources of the resource on the resource hierarchy. Once a policy has been identified as being applicable to a resource on which an operation is requested, then the policy's expression has to be analyzed to determine whether the policy specifies a constraint that allows, restricts or rejects this operation, as further described below.

Table 1 provides several other examples of path prefixes for some embodiments. These embodiments have several additional types of resources, including: provider to identify a router operated by an SDDC provider, interface to identify a network interface, network to identify a tenant network, segment to identify a tenant network segment, and load balancer to identify a load balancer machine or appliance in the datacenter.

TABLE 1

| Resource | Path |
| --- | --- |
| Firewall Rule | /infra/domains/<domain-name>/edge-communication-maps/default/communication-entries/<communication-entry-name> |
| Provider North South Logical Router | /infra/providers/<provider-name> |
| Tenant East West Logical Router | /infra/networks/<network-name> |
| Uplink Interface of Provider North South Logical Router | /infra/providers/<provider-name>/interfaces/<uplink-name> |
| Tenant Subnet | /infra/networks/<network-name>/segments/<segment-name> |
| Load Balancer | /infra/load-balancers/<lb-name> |

Some embodiments leverage path prefixes to specify one of the optional parameters for applying constraints as explained further below. However, other embodiments can replace this approach with another approach to use regular expressions to match or identify some prefixes. Hence, not all embodiments of the invention are limited to using hierarchical paths in the specified policies.

In some embodiments, an expression 210 for a received policy specifies one or more constraint on operations that can be specified on the policy's target resource set. One example of a constraint is a value constraint that restricts a value of an attribute of a resource that is a target of the policy. In some embodiments, the value constraint includes an operator that is one of an include operator, an exclude operator, or an equal operator. Another example of a constraint is an entity instance count constraint that restricts number of instances of the target resource (e.g., restricts number of VPNs, routers, gateways, load balancers, connection sessions, firewall rules, etc.).

Still another example is a related attribute constraint that restricts a value of a secondary attribute of the target resource that has a primary attribute defined by a value constraint. For example, the related attribute constraint can be used to define constraints like "if the destination for traffic is Accounting Workload then the allowed services are restricted to HTTPS and SSH". One of ordinary skill will realize that other embodiments include other types of constraint expressions.

The policy 200 illustrated in FIG. 2 restricts access to destination machines in a destination group to http and https accesses. Specifically, this policy specifies a constraint to be applied at an edge gateway of a tenant T's domain, as indicated by its path prefix 216. This constraint specifies that when a message is addressed to a destination group VCENTER, the message (i.e., the access) should be allowed only when the message's protocol is http or https (i.e., when the access uses http or https protocols).

FIG. 4 illustrates an example to show how the policy 200 of FIG. 2 is provided to the policy input processor in some embodiments. As shown, the policy 200 is provided in a CURL patch command 400 that starts with a CURL instruction followed by "request PATCH \". Next, the policy name is provided as a URL, followed by an authorization header and a content-type description that specifies that the data is in a JSON format. Finally, the policy 200 is provided as the data component of the CURL patch command.

FIG. 5 illustrates another example of a policy. This policy 500 specifies that any communication rule that is specified can only specify an Allow action at the edge gateways. This policy would prevent the administrators from defining rules that reject data messages at the edge gateways. This policy is used as a default firewall policy in a whitelisting (do not allow any communication unless opened with explicit firewall rule) approach that only allows administrators to specify firewall rules at the edge gateway that opens connections.

Figure 6:
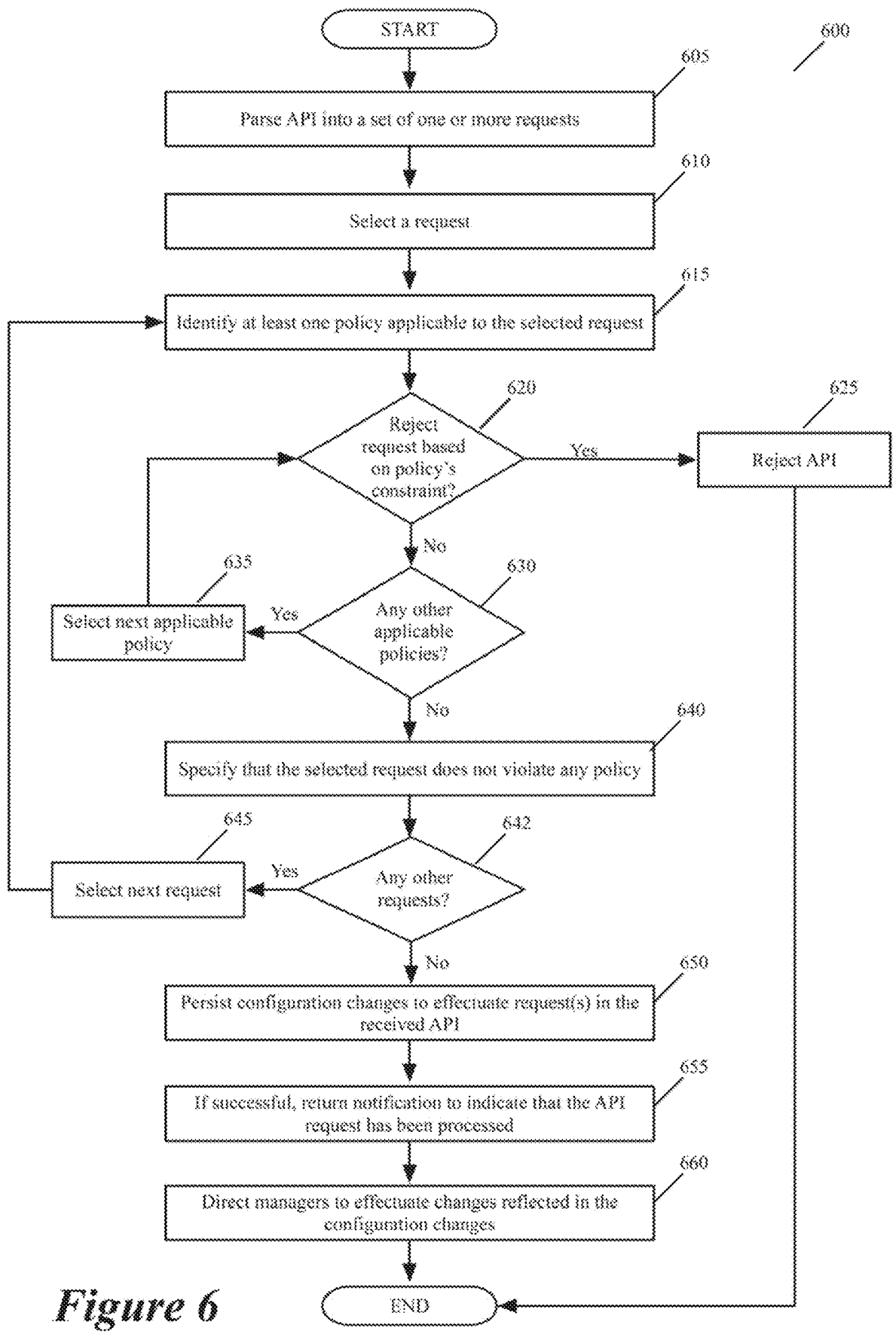
FIG. 6 illustrates a process that the request processor and policy framework perform to process an API regarding software-defined resources in the SDDC.

FIG. 6 illustrates a process 600 that the request processor 125 and policy framework 100 perform to process an API regarding SD resources in the SDDC. In some embodiments, the API is a hierarchical API that specifies one or more operations for one or more SD resources in the SDDC.

In the process 600, the request processor 125 initially parses (at 605) the received hierarchical API into a set of one or more requests for one or more SD resources in the SDDC. In some embodiments, the received API might not only include different requests for different resources, but also might include multiple requests for the one SD resource. The received API can in some embodiments just include multiple different requests for one SD resource. Each request specifies one operation to be performed on a resource in some embodiments, while in other embodiments a request can specify multiple operations to be performed on a resource.

After parsing the API into one or more requests, the request processor 125 calls the policy checking engine 115 to validate each request (i.e., to specify whether each request satisfies all the constraints in all the policies that are applicable to the SD resources referred to in the API). Hence, at 610, the request processor 125 selects a request parsed from the received API. The request processor 125 then directs (at 615) the policy checking engine 115 to identify one or more policies that are applicable to the selected request. Each request is associated with a resource in the resource hierarchy of the SDDC. As mentioned above, each resource can be the parent resource of several other child resources in the resource hierarchy in some embodiments.

At 615, the policy checking engine 115 compares a set of attributes of the selected request's resource with a policy's target to determine whether the policy is applicable to the resource. Specifically, to identify a policy that is applicable to the selected request's resource, the policy checking engine 115 compares one or more attributes of the selected request (e.g., the identifier of the request's associated resource) with one or more attributes specified in the target (e.g., path prefix and resource type) of each policy stored in the policy storage 105 to identify a policy with a matching attribute set (i.e., with an attribute set that matches the selected request's attribute set). For instance, for an API request to adjust web access to Outlook workloads, the policy checking engine 115 would identify the second, third, and fourth policies mentioned above (for the Outlook workload, this workload's web-profile, and this workload's browser access) as being applicable to the API request. In some embodiments, the policy storage 105 stores policies using the same schema in which the policies are defined (e.g., using the same schema as was described above by reference to FIGS. 2, 4, and 5).

After identifying one applicable policy, the policy checking engine determines (at 620) whether the identified policy's expression specifies a constraint that requires the selected request to be rejected. To make this determination, the policy checking engine compares the attribute set of the selected request (e.g., data message flow attributes when the request relates to forwarding operations or service operations on data message flows between machines in the SDDC, deployment attributes when the request relates to deployment of machines or network elements, etc.) with attributes that are specified for the constraint in the applicable policy's expression to ascertain whether the selected request violates the policy's constraint. Thus, while comparing the selected request's resource attribute set with the targets of policies to identify the applicability of the policies to the resource, the policy checking engine 115 compares the resource's attribute set with the expressions of the applicable policies to determine whether the request should be allowed or rejected.

For instance, when the API request requires the creation of a firewall rule, the policy checking engine 115 would identify the policy 500 of FIG. 5 as being an applicable policy and then would determine whether the firewall rule specifies an accept or reject operation. When the requested firewall rule specifies an accept operation, the policy checking engine would determine that the request satisfies the constraint specified by the policy 500, but when the firewall rule specifies a reject, the policy checking engine would determine that the request fails to meet the specified policy and would reject the request.

When the policy checking engine 115 determines (at 620) that the selected request violates the identified policy's constraint, it directs (at 625) the API processing engine 125 to reject the API and return a notification to the source of the API that it has been rejected. After the API processing engine 125 rejects the API, the process ends in some embodiments. In other embodiments, the process 600 does not end after it determines that the API violates at least one policy. In these embodiments, the API processing engine 125 directs the policy checking engine 115 to validate each request in the received API so that it can provide a report to the API source to identify all the policies that the rejected API violated.

When the policy checking engine 115 determines (at 620) that the selected request does not violate the identified policy's constraint, it determines (at 630) whether any other policy in the policy store 105 is applicable to the selected request. If so, this engine 115 selects (at 635) this policy and transitions back to 620 to determine whether this policy's expression specifies a constraint that the request violates. The process loops through 620-635 so long as it can find policies that are applicable to the request and that it has not yet processed. This looping ends when the engine 125 identifies a policy that has a constraint that the request violates or when the engine has finished analyzing policies that are applicable to the request.

When the policy checking engine 115 determines (at 630) that it has examined all policies that are applicable to the selected request, this engine informs (at 640) the API processing engine 125 that the selected request does not violate any policies. Next, at 642, the API processing engine 125 determines whether the received API has any other parsed requests that have not yet been validated by the policy checking engine 115. If so, the API processing engine 125 selects (at 645) the next request and returns to 615 to direct the policy checking engine 115 to validate this newly selected request (i.e., to check whether this request violates any constraint of any policy that is applicable to the request).

When the API processing engine 125 determines (at 642) that the received API has no other parsed requests that have not yet been validated by the policy checking engine 115, the API processing engine uses (at 650) one or more deployment engines (not shown) to persist the configuration change needed for processing the request(s) of the processed hierarchical API (i.e., to specify or change previously specified configuration data regarding any resources affected by the API). These deployment engines specify or change previously specified configuration data in configuration data storage(s) (not shown).

Once the configuration data has been persisted to the configuration data storage(s), the API processing engine 125 returns a notification to the source of the API to indicate that the API request has been processed. Next, at 660, the API processing engine directs one or more resource managers 130 to perform the operation(s) associated with the request(s) in the received API. Instead of being directed by the API processor 125, the deployment plugins direct the resource managers in other embodiments to distribute new or modified configuration data sets from the configuration data storage(s) to the resources.

In response to these notifications from the API processor or the deployment plugins, the resource managers then perform the operation(s) associated with the request(s) in the received API in these embodiments. As mentioned above, a resource manager can perform its operation either by directly interacting with the datacenter resources (e.g., host computers) to define or modify the desired resource (e.g., firewall service machines or modules) or indirectly through local and/or remote controllers, which interact with the datacenter resources to define or modify the desired resources.

After 660, the process 600 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
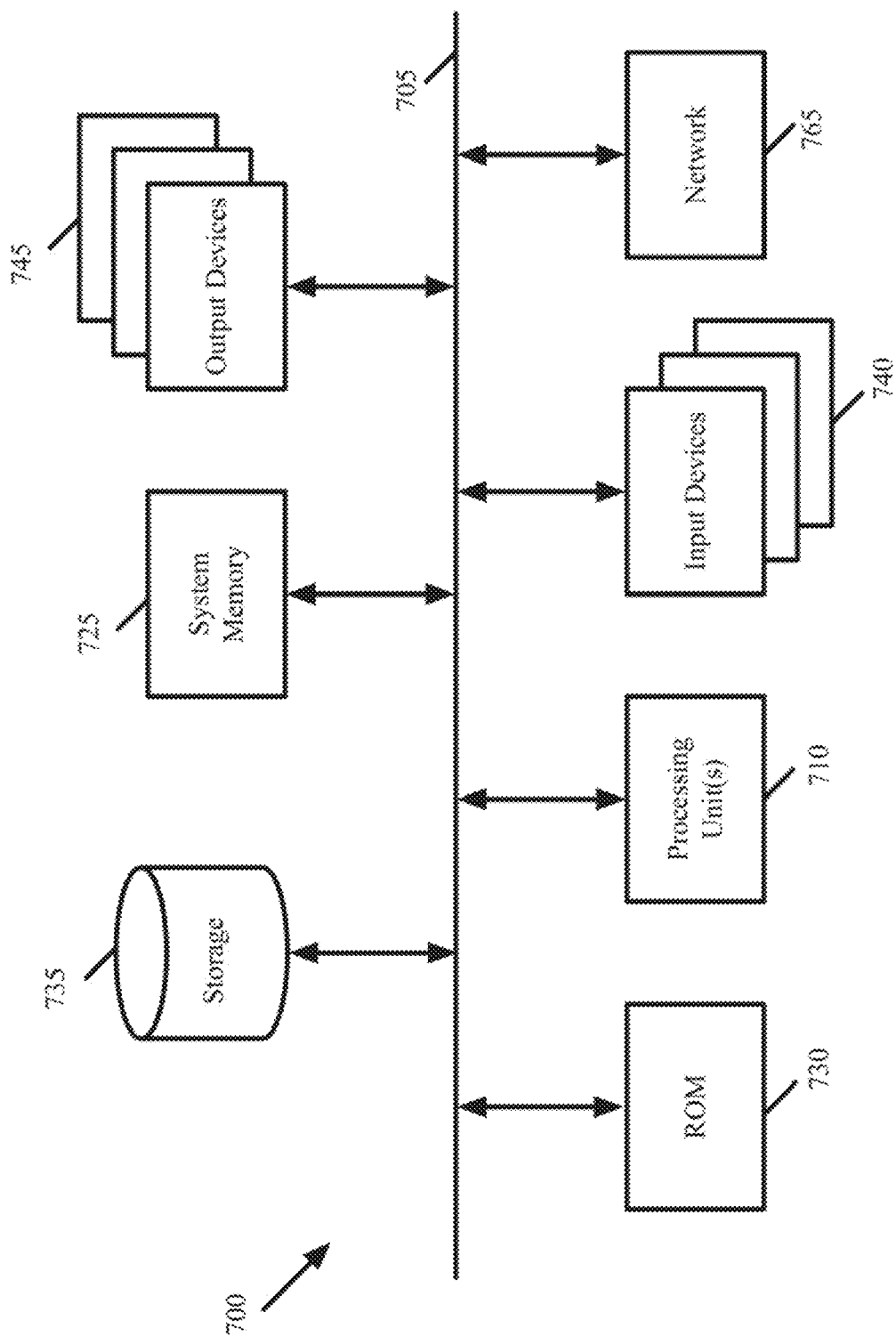
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims

What is claimed is:

1. A method of processing requests for performing operations on resources in a datacenter, the method comprising:
    parsing a declarative API into a plurality of requests with each request specifying at least one operation to perform with respect to at least one resource;
    for each parsed request:
        identifying at least one policy applicable to the request by comparing a set of attributes of the request with sets of attributes of a set of policies that place constraints on operations specified for the resources; and
        determining whether the request violates the policy identified for the request; and
    rejecting the declarative API as an unauthorized API after determining that at least one particular request violates a particular policy identified for the particular request.

2. The method of claim 1, wherein the policies in the set of policies are defined in a declarative format.

3. The method of claim 1, wherein the API is a hierarchical API that identifies resources at different hierarchical levels of the datacenter and the set of policies comprise policies that place constraints on operations specified for resources at different hierarchical resource levels of the datacenter.

4. The method of claim 3, wherein the resources at different hierarchical levels include workloads and service rules.

5. The method of claim 3, wherein the particular request violates the particular policy when the particular request violates a constraint that the particular policy specifies for a particular resource that is associated with the particular request.

6. The method of claim 5 further comprising:
    receiving a plurality of policies before parsing the hierarchical API,
    each policy comprising:
        a target that specifies a set of one or more datacenter resources to which the policy applies, and
        an expression that specifies a constraint on operations on the specified resource set; and
    storing the received policies in a storage that is checked while processing requests for operations associated with the resources.

7. The method of claim 6, wherein the received policies are expressed in a declarative format.

8. The method of claim 7, wherein the target of each policy comprises:
    a resource type for the specified resource set, and
    a path prefix that identifies the specified resource set in a resource hierarchy of the datacenter.

9. The method of claim 7, wherein a plurality of expressions for a set of received policies comprises at least one of:
    a value constraint that restricts a value of an attribute of a resource that is a target of the policy, and
    an entity instance count constraint that restricts number of instances of the target resource.

10. The method of claim 9, wherein the value constraint includes an operator that is one of an include operator, an exclude operator or an equal operator.

11. The method of claim 7, wherein a plurality of expressions for a set of received policies comprises:
    a value constraint that restricts a value of a first attribute of a resource that is a target of the policy, and
    a related attribute constraint that restricts a value of a second attribute of the target resource.

12. The method of claim 3, wherein a particular resource specified by the particular request is at a particular level in the hierarchy, wherein comparing comprises comparing the particular request's set of attributes with attribute sets of policies specified for resources defined at the particular level in the hierarchy or higher.

13. The method of claim 12, wherein the particular resource is a child of another resource, and the policy for the particular resource is specified for the other resource.

14. The method of claim 1, wherein each request in the plurality of requests is a request to create or modify a forwarding rule for forwarding data messages, a request to create or modify a service rule for performing service operation on a data message, or a request to deploy or modify a machine or network element in the datacenter.

15. The method of claim 1, wherein
    the method is implemented by a policy framework,
    each policy specifies a resource type that identifies a type of resource to which the policy applies,
    the inclusion of the resource type in the policy allowing new resource types to be added to the policy framework without reprogramming the framework.

16. The method of claim 1,
wherein identifying the at least one policy for each request comprises:
identifying all policies that are applicable to the request, and
determining whether the request satisfies all policies identified for the request.

17. A non-transitory machine readable medium storing a program for processing requests for performing operations on resources in a datacenter, the program comprising sets of instructions for:
parsing a declarative API into a plurality of requests with each request specifying at least one operation to perform with respect to at least one resource;
for each parsed request:
identifying at least one policy applicable to the request by comparing a set of attributes of the request with sets of attributes of a set of policies that place constraints on operations specified for the resources; and
determining whether the request violates the policy identified for the request;
rejecting the declarative API as an unauthorized API after determining that at least one particular request violates a particular policy identified for the particular request; and
authorizing the declarative API for execution after determining that none of the parsed requests violate any of the identified policies.

18. The non-transitory machine readable medium of claim 17, wherein the API is a hierarchical API, wherein the program further comprises sets of instructions for:
receiving a plurality of policies before parsing the hierarchical API,
each policy comprising:
a target that specifies a set of one or more datacenter resources to which the policy applies, and
an expression that specifies a constraint on operations on the specified resource set; and
storing the received policies in a storage that is checked while processing requests for operations associated with the resources.

19. The non-transitory machine readable medium of claim 18, wherein the received policies are expressed in a declarative format.

20. The non-transitory machine readable medium of claim 18, wherein the target of each policy comprises:
a resource type for the specified resource set, and
a path prefix that identifies the specified resource set in a resource hierarchy of the datacenter.

21. The non-transitory machine readable medium of claim 18, wherein a plurality of expressions for a set of received policies comprises at least one of:
a value constraint that restricts a value of an attribute of a resource that is a target of the policy, and
an entity instance count constraint that restricts number of instances of the target resource.

22. The non-transitory machine readable medium of claim 18, wherein a plurality of expressions for a set of received policies comprises:
a value constraint that restricts a value of a first attribute of a resource that is a target of the policy, and
a related attribute constraint that restricts a value of a second attribute of the target resource.

23. The non-transitory machine readable medium of claim 17, wherein a particular resource specified by the particular request is at a particular level in the hierarchy, wherein comparing comprises comparing the particular request's set of attributes with attribute sets of policies specified for resources defined at the particular level in the hierarchy or higher.

* * * * *